United States Patent
Vignolle et al.

(10) Patent No.: US 8,389,938 B2
(45) Date of Patent: Mar. 5, 2013

(54) METHOD FOR PROCESSING IMAGES ARISING FROM A PHOTOSENSITIVE DETECTOR AND PHOTOSENSITIVE DETECTOR

(75) Inventors: Jean-Michel Vignolle, St. Jean de Moirans (FR); Thibaut Wirth, Moirans (FR)

(73) Assignee: Thales, Neuilly sur Seine (FR)

( * ) Notice: Subject to any disclaimer, the term of this patent is extended or adjusted under 35 U.S.C. 154(b) by 376 days.

(21) Appl. No.: 12/739,794

(22) PCT Filed: Oct. 27, 2008

(86) PCT No.: PCT/EP2008/064552
§ 371 (c)(1),
(2), (4) Date: Sep. 17, 2010

(87) PCT Pub. No.: WO2009/053494
PCT Pub. Date: Apr. 30, 2009

(65) Prior Publication Data
US 2010/0328508 A1    Dec. 30, 2010

(30) Foreign Application Priority Data
Oct. 26, 2007    (FR) ..................... 07 07563

(51) Int. Cl.
*H01L 25/00*    (2006.01)
(52) U.S. Cl. ...................................... 250/332
(58) Field of Classification Search .................. 250/238, 250/332, 370; 382/274, 275
See application file for complete search history.

(56) References Cited

U.S. PATENT DOCUMENTS
2005/0029453 A1    2/2005 Allen et al.

*Primary Examiner* — Thanh Luu
*Assistant Examiner* — Renee Naphas
(74) *Attorney, Agent, or Firm* — Baker Hostetler LLP

(57) ABSTRACT

The present invention relates to a method of processing images obtained from a photosensitive detector of the type notably produced by semiconductor material deposition techniques. The method consists in correcting an image acquired by the detector with a gain image. According to the invention, a temperature gain drift correction image is applied to the acquired image as a function of a temperature measured by the detector during the acquisition of the image. The invention also relates to a photosensitive detector in which the temperature gain drift correction means are included, independently of the gain image.

9 Claims, 4 Drawing Sheets

METHOD FOR PROCESSING IMAGES ARISING FROM A PHOTOSENSITIVE DETECTOR AND PHOTOSENSITIVE DETECTOR

CROSS-REFERENCE TO RELATED APPLICATIONS

This application is a National Stage of International patent application PCT/EP2008/064552, filed on Oct. 27, 2008, which claims priority to foreign French patent application No. FR 07 07563, filed on Oct. 26, 2007, the disclosures of which are incorporated by reference in their entirety.

FIELD OF THE INVENTION

The present invention relates to a method of processing images obtained from a photosensitive detector of the type notably produced by semiconductor material deposition techniques. The invention also relates to a photosensitive detector implementing the method according to the invention. The invention relates more particularly (but not exclusively) to the processing of radiological images. The detector is, for example, produced in the form of a matrix of photosensitive points. It can also be produced in the form of a strip of photosensitive points and even in the form of an analog detector.

BACKGROUND OF THE INVENTION

The techniques involving the thin-film deposition of semiconductor materials such as hydrogenated amorphous silicon (aSiH), on glass insulating substrates for example, can be used to produce matrices of photosensitive points that can produce an image from a visible or near-visible radiation. To use these matrices in the detection of radiological images, all that is needed is to insert, between the X-radiation and the matrix, a scintillator screen for converting the X-radiation into light radiation in the band of wavelengths to which the photosensitive points are sensitive.

A first defect affects the quality of images acquired by the photosensitive detector. The semiconductor components used in such detectors are not all identical and the photosensitive detector inherently has non-uniformities which are reflected in corrupted areas.

To try to obtain a useful image of optimum quality, a first correction of the image acquired by the detector is performed on the basis of a so-called offset image, known as a "black image", generally taken and stored at the start of an operating cycle. This offset image is the image obtained when the photosensitive detector is exposed to a signal of zero intensity and corresponds to a kind of background image. The offset image varies as a function of the electrical state of the components of the photosensitive points and of the dispersion of their electrical characteristics. The useful image is the one read when the photosensitive detector has been exposed to a useful signal that corresponds to an exposure to an X-radiation. It encompasses the offset image. The correction consists in performing a subtraction between the useful image and the offset image.

A second correction applied to the image is a gain correction. This correction is generally a multiplying correction and may depend on each photosensitive point. The term "gain image" is then used. This is a matrix of the same size as the photosensitive matrix. The so-called gain matrix comprises, in association with each photosensitive point, a corrective coefficient to be applied to the level measured by the corresponding photosensitive point to obtain a so-called useful image.

The gain image cannot be defined during the normal use of the photosensitive detector. The gain image is defined during a calibration phase which may take a few minutes during which the photosensitive detector is unavailable.

It will be realized that the gain image varies as a function of the temperature of the detector. Sometimes, visible non-uniformities appear in the image and render the image unusable notably in the medical radiology domain. As soon as the temperature varies, typically by around three degrees, it may sometimes be necessary to repeat the calibration phase. To alleviate this problem, temperature-stabilized photosensitive detectors have been produced. To achieve this stability, the detector can be used only after a waiting time of several hours after the detector has been powered up. The temperature of the detector may deviate by more than three degrees from its average temperature. In this case, the image quality may possibly be degraded and it will be necessary to provide for a new detector calibration phase and therefore for the immobilization of said detector. To improve the thermal stability of the detector, coolant circulation has been implemented in the detector. This solution is costly and difficult to implement.

The solutions for stabilizing detector temperature may be adapted to a fixed use, in a room specially dedicated to radiology for example.

SUMMARY OF THE INVENTION

The aim of the invention is to enable photosensitive detectors to operate in an environment in which the temperature is likely to change, for example in a portable application of a detector.

To this end, the subject of the invention is a method of processing images obtained from a photosensitive detector, the method consisting in processing an image acquired by the detector, the image being corrected by a gain image, characterized in that the acquired image has applied to it a temperature gain drift correction image that is a function of a temperature measured by the detector during the acquisition of the image.

Another subject of the invention is a photosensitive detector intended for installation in a system comprising a generator of radiation to which the detector is sensitive, the detector implementing the method of the invention, the gain image being specific to the system, characterized in that the detector comprises means for applying a temperature gain drift correction image to the acquired image as a function of a temperature measured by the detector.

One advantage of the invention is that any calibration phase for determining a new gain image is avoided, even if the temperature of the detector changes.

Another advantage of the invention is that the storage of several gain images at different temperatures is avoided.

BRIEF DESCRIPTION OF THE DRAWINGS

The invention will be better understood and other advantages will become apparent from reading the detailed description of a number of embodiments of the invention given by way of example, the embodiments being illustrated by the appended drawing in which.

In the interests of clarity, the same elements are given the same identifiers in the different figures.

DETAILED DESCRIPTION

The invention applies to an image acquired by a photosensitive detector organized in a matrix for example. A first correction consists in applying to the acquired image a correction that is a function of an offset image as described previously. This first correction is, for example, a subtractive correction. More specifically, the offset image is an image produced by the detector itself when it is not subject to any useful radiation. For example, in medical imaging using X-rays, the offset image is obtained in the absence of X-rays. The offset image is a matrix image and the signal level recorded for each point of the matrix of the offset image is subtracted from the level of the corresponding point in the acquired image.

A second correction consists in applying a gain correction to the offset-corrected acquired image. As previously, a correction matrix is defined that comprises as many points as the matrix of the detector. This gain correction matrix comprises a correction coefficient to be applied to each point of the acquired image. This correction matrix is called gain image. The gain correction is, for example, a multiplying correction. In other words, the level of each point of the acquired image is multiplied by the corresponding correcting coefficient.

The gain image depends on the use of the photosensitive detector. For example, in X medical imaging, the photosensitive detector is a component of a system comprising an X-ray generator. The gain image is determined for the complete system and not only according to the detector alone. The gain image cannot be defined during the construction of the detector.

On the other hand, the gain image varies essentially as a function of the temperature of the detector. The invention therefore consists in applying, to the acquired image, a temperature gain drift correction image that is a function of a temperature measured by the detector. As previously, the expression "gain drift correction image" should be understood to mean a matrix of the same size as that of the photosensitive detector and containing a correction coefficient associated with each photosensitive point. The temperature gain drift correction image may be specific to the photosensitive detector independently of the system to which the detector belongs.

Figure 1:
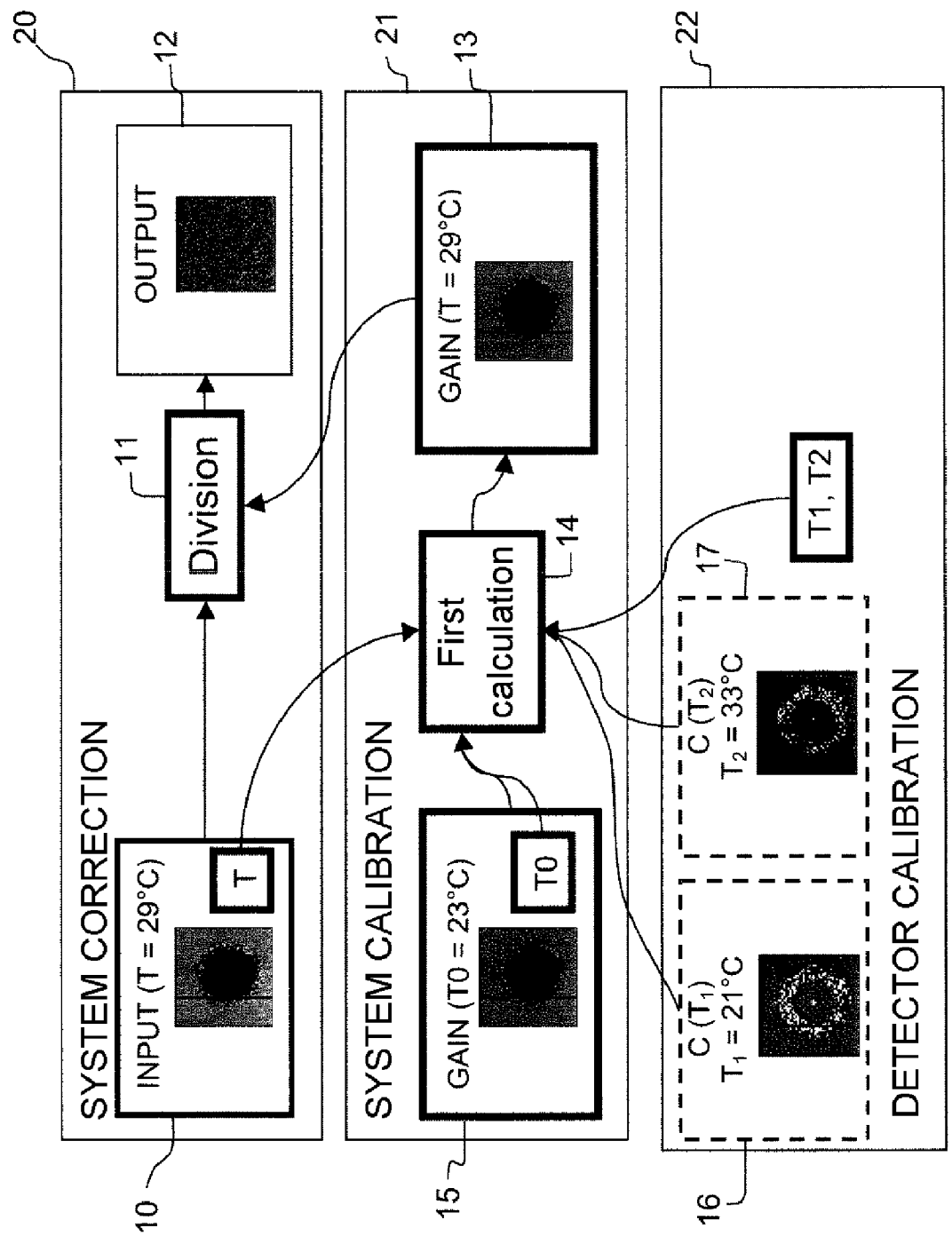
FIG. 1 represents a first embodiment of a method according to the invention.

FIG. 1 diagrammatically represents a first embodiment of a method according to the invention. The item 10 represents an offset-corrected acquired image denoted INPUT(T), T representing a temperature measured by the photosensitive detector. To illustrate this embodiment, a temperature T of 29° C. has been chosen. A gain correction, in this case a division 11, is applied to the offset-corrected acquired image INPUT(T) to obtain an output image 12 free of gain artefacts and denoted OUTPUT. The gain correction is produced by means of a gain image 13 at the temperature T, that is, 29° C., and denoted Gain(T). The gain image is obtained by a first calculation 14 that takes into account a gain image 15 at a temperature T0, in this case 23° C. and denoted Gain (T0), and two gain drift correction images 16 and 17, respectively at two distinct temperatures T1=21° C. and T2=33° C., and respectively denoted C(T1) and C(T2). The gain correction is represented in a box 20 combining the offset-corrected acquired image 10, the division 11 and the output image 12. The calibration of the system is represented in a box 21 combining the gain image, Gain (T0), 15, the first calculation 14 and the gain image, Gain(T), 13. All of the operations carried out in the boxes 20 and 21 are carried out by the system. The calibration of the detector is represented in the box 22 and comprises the two gain drift correction images: C(T1) 16 and C(T2) 17, and the values of the two temperatures T1 and T2.

The first calculation 14 can be performed as follows:

$$a = (T-T1)/(T2-T1) \quad (1)$$

$$a0 = (T0-T1)/(T2-T1) \quad (2)$$

$$b = (1-a) \cdot C(T1) + a \cdot C(T2) \quad (3)$$

$$b0 = (1-a0) \cdot C(T1) + a0 \cdot C(T2) \quad (4)$$

$$\text{Gain}(T) = \text{Gain}(T0) \cdot b/b0 \quad (5)$$

In the preceding five equations, the parameters a, a0, b and b0 are used simply to simplify the writing of the first calculation 14.

The division 11 and the first calculation 14 are carried out in the system itself and not in the photosensitive detector. The user of the system must have the detector calibration information represented in the box 22. This information may be supplied by the manufacturer of the detector on an external medium, or will advantageously be entered into a memory of the detector so that the user of the system can reread the information by interrogating the detector.

In the example proposed above, the gain correction and the temperature gain drift correction are multiplying corrections. The commutative property of these two multiplications is used to correct the temperature drift before the gain correction.

Figure 2:
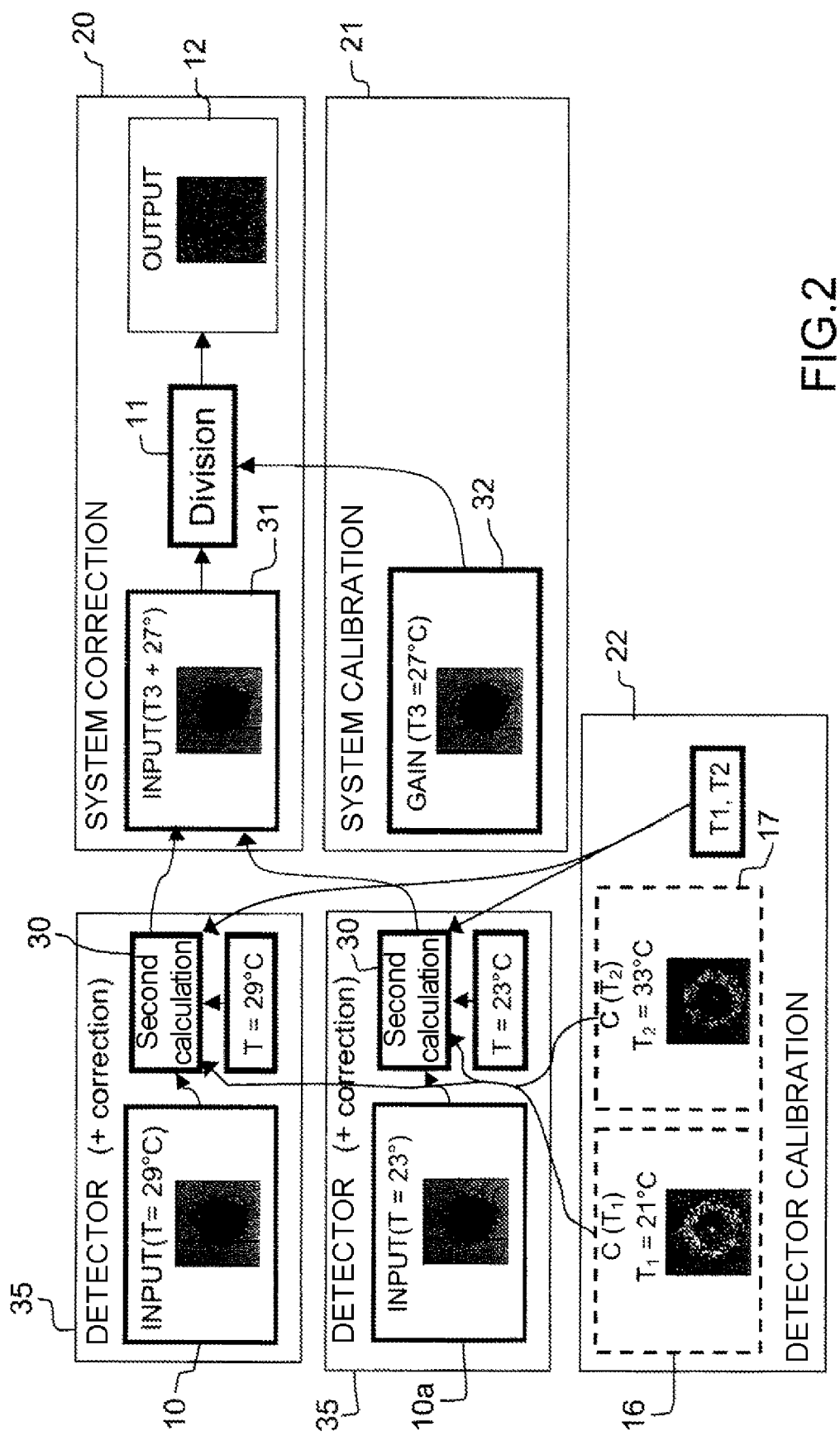
FIG. 2 represents a second embodiment of a method according to the invention.

FIG. 2 represents a second embodiment of the image processing method according to the invention, an embodiment in which the first calculation 14 is broken down differently so as to be able to perform the temperature gain drift correction within the detector itself. The detector then produces offset and temperature gain drift corrected images by bringing them to a virtual temperature T3. T3=(T1+T2)/2 is, for example, chosen. The user of the system no longer has to take account of the temperature T of the detector.

Although the gain image is specific to the system and not to the detector alone, it is possible to model, within the detector, independently of the rest of the system, notably an X-ray generator, the temperature drift of the gain image. This modeling of the temperature drift may be modeled by the manufacturer of the detector even before the detector is incorporated in a system. This modeling operation consists in determining a temperature drift of a gain image without knowing this gain image.

The acquired image 10 INPUT(T) for a temperature T of 29° C. undergoes a temperature gain drift correction by means of a second calculation 30 to obtain an image 31 that is equivalent to the acquired image 20, but with the temperature drift corrected. This image is brought to the virtual temperature T3. The image 31 is denoted INPUT(T3). Another offset-corrected acquired image 10a also undergoes the correction of the second calculation 30 to also obtain an image 31 again brought to the virtual temperature T3. Then, the system applies the gain correction by means of the division 11 by a gain image 32 denoted Gain(T3) to obtain the output image OUTPUT 12. The gain image 32 is similar to the gain images 13 and 15. Each gain image relates to a temperature. The gain image 32 relates to the temperature T3. As for the first calculation 14, the second calculation 30 takes account of the two gain drift correction images C(T1) 16 and C(T2) 17 respectively at the two temperatures T1=21° C. and T2=33° C.

FIG. 2 contains the boxes 20, 21 and 22 already described through FIG. 1. In addition, FIG. 2 shows a box 35 in which the second calculation 30 corrects the temperature gain drift to obtain the image 31 delivered to the system. The operations of the box 35 can be implemented in the detector itself without using data originating from the rest of the system.

The second calculation 30 can be done as follows, reusing the equations (1) and (3) already implemented in the first calculation 14.

$$a=(T-T1)/(T2-T1) \quad (1)$$

$$b=(1-a)\cdot C(T1)+a\cdot C(T2) \quad (3)$$

$$\text{INPUT}(T3)=\text{INPUT}(T)\cdot b \quad (6)$$

The equation (6) is deduced from the fact that T3=(T1+T2)/2, therefore, by replacing T0 with T3 in the equation (2), we obtain a3=½ and, because C(T1)+C(T2)=2 therefore in the equation (4), we obtain b3=1. C(T1)+C(T2)=2 is due to the fact that these two images are normalized around a mean as explained below.

Tests have shown that the gain drift correction increases the noise in the duly corrected image and that the correction is necessary only on certain portions of the image, more specifically, the portions in which the gain variations as a function of the temperature between neighboring points exceed a given threshold. In these portions only, a temperature gain drift correction image is applied to the acquired image. In the other portions, either no gain drift correction is applied, or a correction is applied which does not add noise, for example a correction of the low frequencies only. In these portions there is therefore no noise increase in the acquired image. Following this partial correction of the acquired image 10, the gain correction is, of course, applied to the complete image.

To make this partial correction, it is possible, for example, to measure two gain images G(T1) and G(T2) at two different temperatures, in this case T1 and T2. These two gain images can be measured for a typical system used in manufacturing the detector. It will be realized that the temperature gain drift correction images C(T1) and C(T2), defined for the typical system, may also be used even for other systems, for example when the generator of the radiation to which the detector is subjected is changed and the gain images are different. As in the first embodiment illustrated by FIG. 1, it is possible to determine the correction images C(T1) and C(T2) without knowing the gain image of the complete system. By virtue of the invention, for any new system, it is possible to perform a calibration to define a gain image only for a single temperature, the correction images C(T1) and C(T2) remaining valid.

Figure 3:
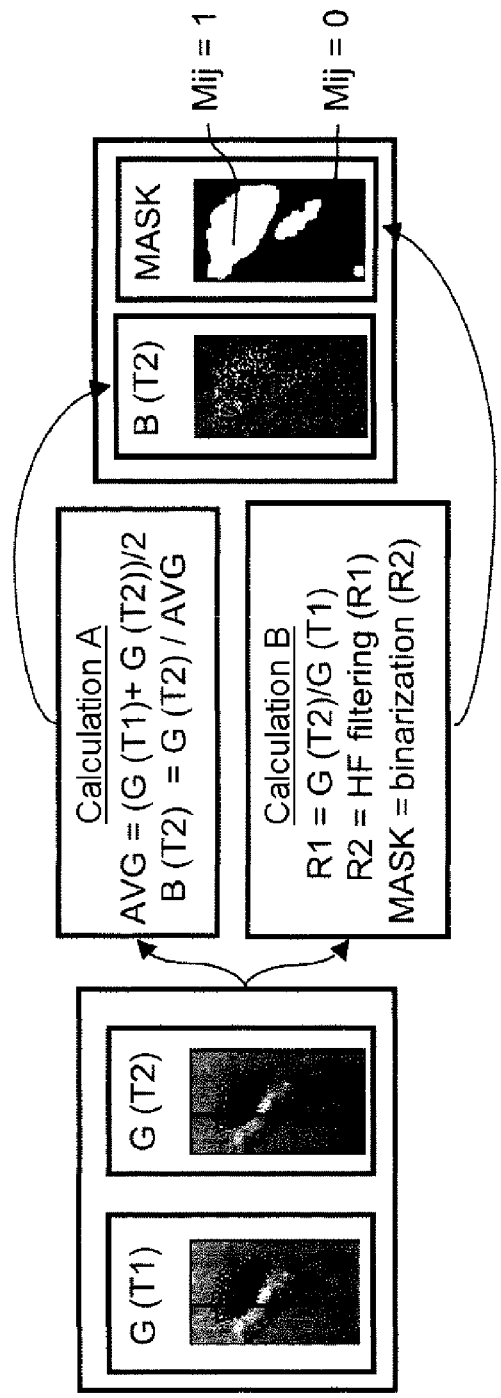
FIGS. 3, 4 and 5 represent an example of the generation of gain drift correction images used for the second embodiment.
Figure 4:
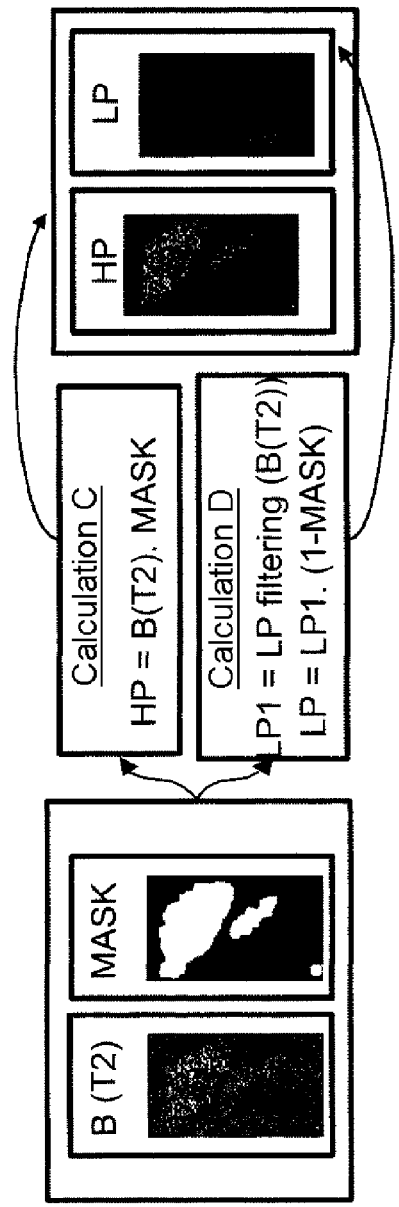
Figure 5:
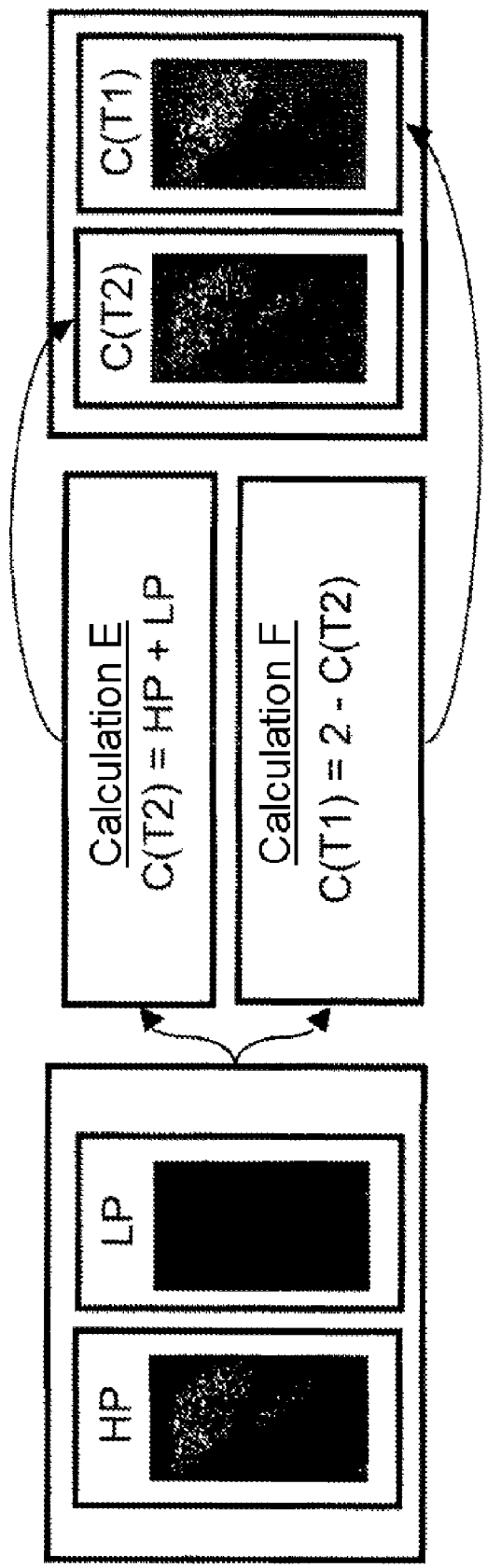

One example of the generation of the correction images C(T1) and C(T2) is illustrated by means of FIGS. 3, 4 and 5.

In FIG. 3, in the calculation A, an average AVG is defined between the two gain images:

$$\text{AVG}=(G(T1)+G(T2))/2 \quad (7)$$

followed by a normalized corrective B(T2) for example for the temperature T2:

$$B(T2)=G(T2)/\text{AVG} \quad (8)$$

The selection of the areas to be corrected is illustrated in FIG. 3 by means of the calculation B. A deviation R1 is defined between the two gain images G(T1) and G(T2):

$$R1=G(T2)/G(T1) \quad (9)$$

The deviation R1 is then filtered relative to a given threshold to define a mask MASK in matrix form. An example of the determination of the deviation R1 and of the mask MASK is given in the calculation B. The filtering operation is denoted "HF filtering" and is used for the purpose of retaining only the high frequency areas of the deviation R1:

$$R2=HF \text{ filtering}(R1) \quad (10)$$

The result of the filtering, in the form of a matrix is denoted R2. It is possible, for example to define the high-frequency filtering operation as the difference between the deviation R1 and the sliding average of the deviation R1 on a kernel of given size, for example 7×7.

The mask MASK is obtained by an operation denoted:

$$\text{MASK}=\text{binarization}(R2) \quad (11)$$

The calculation of the mask MASK according to the equation (11) is, for example, performed by calculating a standard deviation σ of the matrix R2 and then, for each point R2$ij$ of the matrix R2, a corresponding point M$ij$ of the mask MASK is defined as follows:

M$ij$=1 if the absolute value of R2$ij$ is greater than 3×σ and M$ij$=0 otherwise.

The duly obtained matrix can have applied to it an expansion operation based on a centered kernel of size 7×7. The term "expansion" should be understood to mean a mathematical morphology operation called gray level expansion. The expansion can also be defined as belonging to the family of convolutions that can be used to replace each pixel with a linear combination of neighboring pixels. The neighborhood of a pixel is defined by a convolution matrix or kernel. In the case of a kernel of size 7×7 on the binary matrix of the mask, the expansion consists in setting to 1 any point located at a distance of three pixels or less from a pixel of value 1. The distance of three pixels may be interpreted in the sense of a cell movement of a king according to the usual rules of a game of chess. M1 denotes the value of the points before expansion and M2 the value of the points after expansion. The use of an expansion makes it possible to obtain a mask that completely covers the areas to be corrected. Without this operation there would be "gaps" in the areas to be corrected. The expansion operation is also used to slightly enlarge the areas to be corrected to be sure of covering them entirely and to avoid the outlines of excessively convoluted areas.

In the example represented in FIG. 3, the value 1 for the points M$ij$ is represented in white and the value 0 is represented in black.

Advantageously, to smooth the edge effects at the boundary between the areas in which M$ij$=1 and M$ij$=0, fractional values between 0 and 1 can be given to the points M$ij$ situated on this boundary. M3 is used to denote the value of the points after expansion. For example, the values of M3 can be obtained by establishing a sliding average of M2 by a kernel of size 5×5.

FIG. 4 illustrates the distinction between the normalized correction that can be applied to the high-frequency and low-frequency areas. The temperature gain drift correction can be applied only in the high-frequency areas of the deviation R1. This correction is illustrated in the calculation C in which a correction, denoted HP, corresponding to the normalized correction B(T2) is applied only to the pixels where the values of the mask MASK are not zero. For the points for which the values of the points of the mask MASK are zero, the correction B(T2) is not applied. The calculation C is expressed by:

$$HP=B(T2)\cdot \text{MASK} \quad (12)$$

In addition, it is possible to apply, to the points for which the values of the mask MASK are zero, a correction that does not bring about any noise in the final image. This noise-free correction is illustrated in the calculation D by retaining only the low-frequency values, denoted LP1, of the normalized correction B(T2). These values are given by:

$$LP1 = LP \text{ filtering}(B(T2)) \quad (13)$$

The low-frequency filtering "LP filtering" is, for example, defined as a sliding average by a kernel of size 31×31.

The application of the correction LP1 to the points for which the values in the mask are zero is obtained by:

$$LP = LP1 \cdot (1-MASK) \quad (14)$$

The use of the formulas (12) and (14) makes it possible to take into account the values of the points of the mask MASK that are possibly between 0 and 1. The correction B(T2) is thus applied, gradually, to the boundary of the area in which Mij=1. Similarly, the correction LP1 is applied gradually to this boundary. The gradual application is effective on the pixels where the values of the points of the mask MASK are between 0 and 1.

FIG. 5 illustrates the overall temperature gain drift correction image for all of the offset-corrected acquired image. This overall correction is obtained in the calculation E by adding together the corrections HP and LP:

$$C(T2) = HP = LP \quad (15)$$

In the example being considered, C(T1) and C(T2) are distributed linearly around the average AVG. It is therefore possible to determine only a single correction, C(T2) in this case, and to determine the other correction C(T1) by the calculation F:

$$C(T1) = 2 - C(T2) \quad (16)$$

This method can be expressed as a determination of drift according to the temperature of the gain correction image.

It is, of course, possible not to determine the temperature gain drift correction image in derivative mode but to do so from two distinct images C(T1) and C(T2).

The invention claimed is:

1. A method of processing images obtained from a photosensitive detector, the method consisting in processing an image acquired by the detector, the image being corrected by a gain image, wherein the acquired image has applied to it a temperature gain drift correction image that is a function of a temperature measured by the detector during the acquisition of the image and wherein a portion of the image is determined in which the gain variations as a function of the temperature between neighboring points exceed a given threshold and in that a temperature gain drift correction image for the determined portion is applied to the acquired image.

2. The method as claimed in claim 1, wherein the temperature gain drift correction image is applied to the acquired image before correction by the gain image.

3. The method as claimed in claim 1, wherein, before a temperature gain drift image is applied to the acquired image, the acquired image is corrected according to an offset image.

4. The method as claimed in claim 1, wherein the temperature gain drift image is defined according to at least two gain drift images, each at a given temperature defined previously.

5. The method as claimed in claim 1, wherein a gain image taken at a given temperature is applied to the acquired image and wherein the gain drift correction image is used to correct the drift between the measured temperature and the given temperature.

6. The method as claimed in claim 1, wherein, for points of the image that do not belong to the portion, a temperature gain drift correction image filtered at low frequency is applied to the acquired image.

7. The method as claimed in claim 1, wherein the temperature gain drift correction image is applied gradually to one boundary of the portion.

8. The method as claimed in claim 1, wherein the detector is organized as a matrix, in that the gain image and the temperature gain drift correction image are organized as a matrix of the same size as the matrix of the detector and wherein the gain image and the temperature gain drift correction image both comprise multiplying coefficients applied to each point of the acquired image.

9. A photosensitive detector intended for installation in a system comprising a generator of radiation to which the detector is sensitive, the detector implementing a method as claimed in claim 1, the gain image being specific to the system, wherein the detector comprises means for applying a temperature gain drift correction image to the acquired image as a function of a temperature measured by the detector during the acquisition of the image.

* * * * *

UNITED STATES PATENT AND TRADEMARK OFFICE
CERTIFICATE OF CORRECTION

PATENT NO. : 8,389,938 B2  Page 1 of 1
APPLICATION NO. : 12/739794
DATED : March 5, 2013
INVENTOR(S) : Vignolle et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 520 days.

Signed and Sealed this
First Day of September, 2015

Michelle K. Lee
*Director of the United States Patent and Trademark Office*